Nov. 21, 1933.　　　　　C. SEIDLER　　　　　1,935,893
STRUCTURE FOR DISTRIBUTION OF LOOSE MILK
Filed Jan. 12, 1932　　3 Sheets-Sheet 1
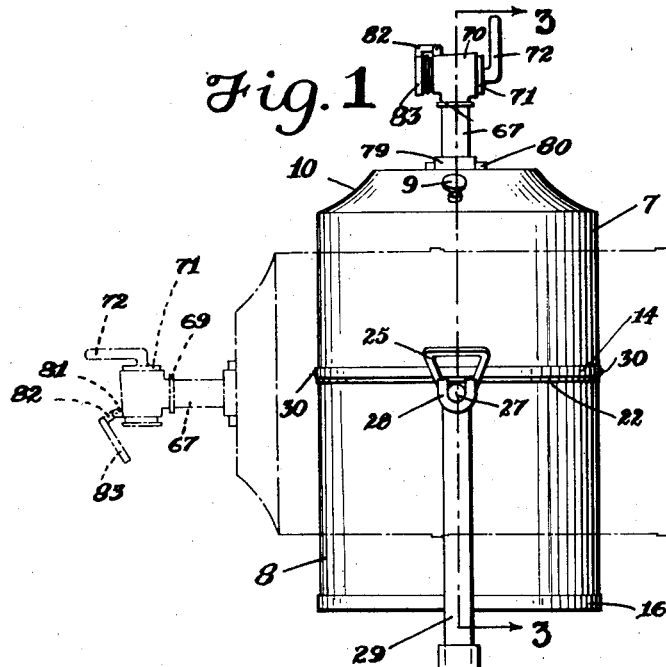
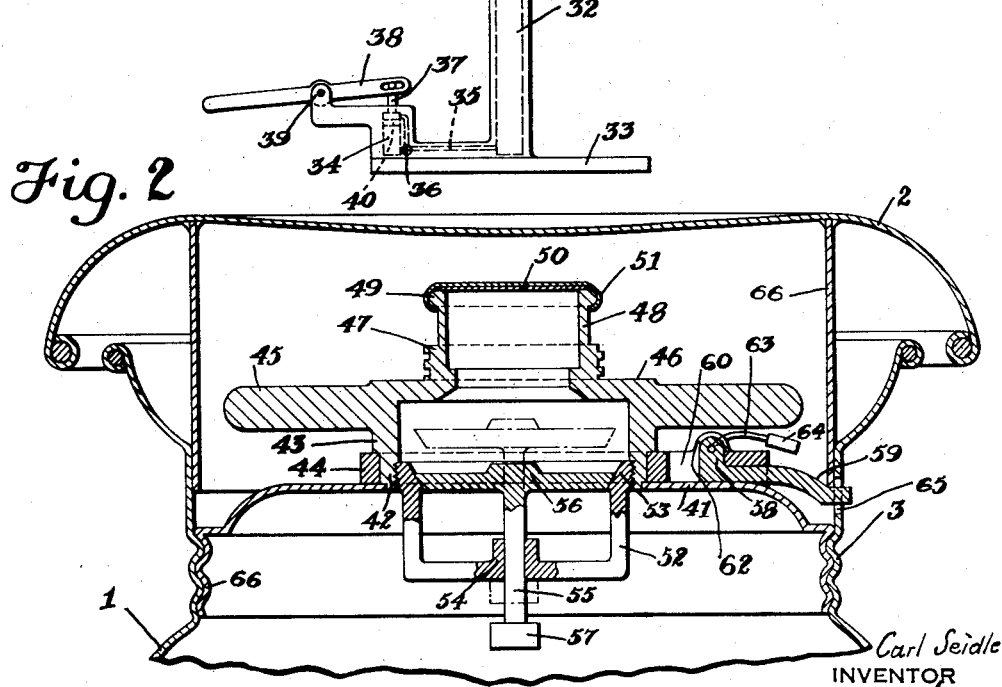
Carl Seidler
INVENTOR
BY Julian E. Meucher
ATTORNEYS

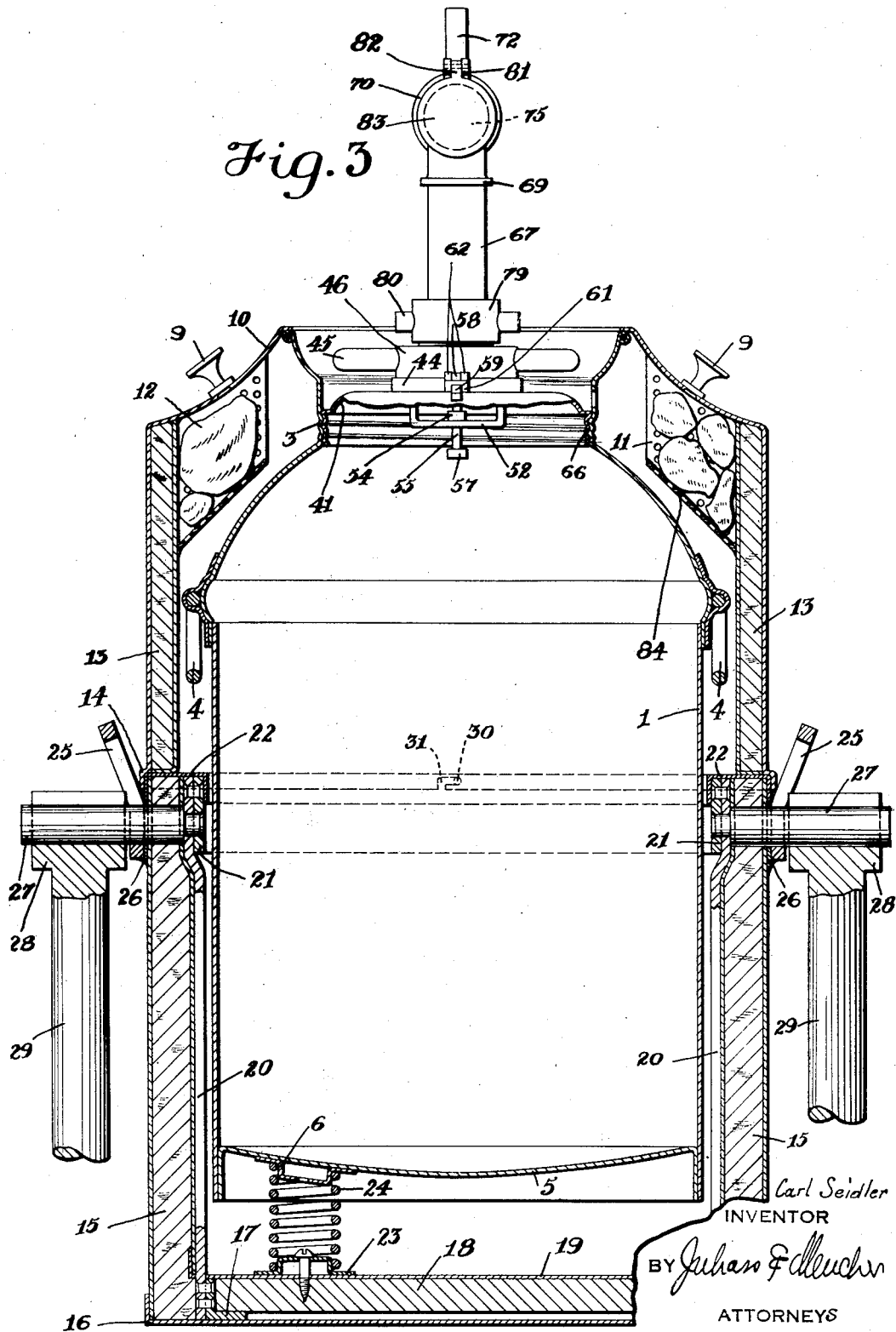

Nov. 21, 1933.    C. SEIDLER    1,935,893
STRUCTURE FOR DISTRIBUTION OF LOOSE MILK
Filed Jan. 12, 1932    3 Sheets-Sheet 3

Carl Seidler
INVENTOR
BY
ATTORNEYS

Patented Nov. 21, 1933

1,935,893

UNITED STATES PATENT OFFICE 1,935,893

STRUCTURE FOR DISTRIBUTION OF LOOSE MILK

Carl Seidler, New York, N. Y., assignor to Alarico Valle, Westchester County, N. Y.

Application January 12, 1932. Serial No. 586,113

6 Claims. (Cl. 221—67)

This invention relates generally to new structures for the storing, transportation, dispensing, refrigeration and safe-guarding against adulteration and unlawful tampering of loose milk. More specifically, the invention relates to an outer discharge valve and inner uni-directional valve set in place on a milk can container at the filling station with means of detecting tampering therewith thereafter, a cover for the said milk can for purposes of transportation and a refrigerator to be used in conjunction with said milk can container for purposes both of serving as a cooling element and affording an adaptable horizontal position for dispensing the contents of the said milk can.

The structures above enumerated, it is understood, all cooperate with one another to offer safe means of transportation of loose milk, economic refrigeration of the same, sanitary means of dispensing loose milk and structures detecting tampering and preventing adulteration of the milk when in transit from the filling stations.

The main object of the invention is to provide structure for the dispensing of loose milk wherein stirrers, agitators and dippers are eliminated in the sale of loose milk from milk can containers.

Another object of the invention is provision of structure wherein the ultimate consumer is assured that the loose milk sold has the ingredients, the purity and contents observed by the legal authorities at the filling stations.

Another object of the invention is provision of structure wherein the retailer by very little physical effort of the hand is enabled to swing the refrigerator of the milk can container contained therein by the slightest physical exertion and maintain the said position until the proper quantity of loose milk is poured therefrom from the outer discharge valve as above mentioned.

These objects and other incidental ends and advantages will appear incidentally in the progress of the disclosure wherein the accompanying drawings form a part thereof and wherein corresponding reference characters of the said drawings represent corresponding parts of structure throughout the several views.

Figure 1 is a side elevation of structure embodying a preferred form of the invention showing a swinging refrigerator on a frame in a normal, upright and horizontal position, the said refrigerator enclosing a milk can container, an outer discharge valve and a lifting mechanism;

Figure 2 is a diametric section of a preferred embodiment of the invention taken through the upper portion of a milk can container and the cover thereof showing preferred structure of a uni-directional valve affixed to the said milk can;

Figure 3 is a diametric section of Figure 1 taken along line 3—3 thereof;

Figure 4:
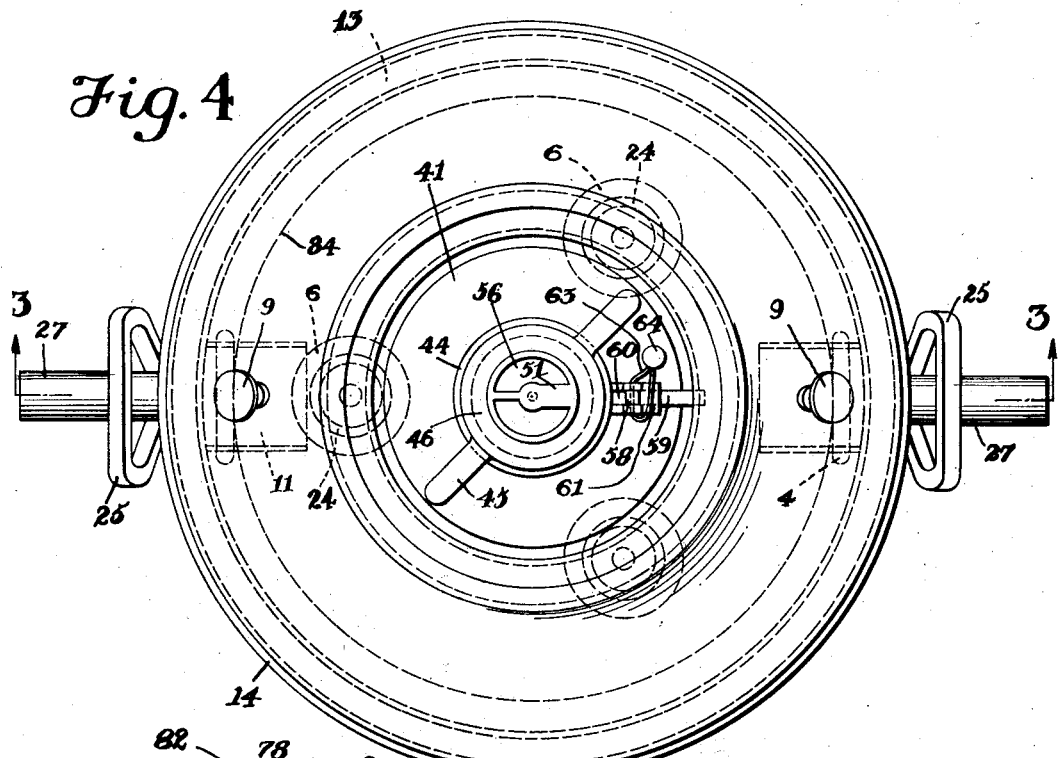
Figure 4 is a plan view of Figure 1 with the outer discharge valve detached therefrom, Figure 3 being a section taken at line 3—3 of this figure.

In the drawings, 1 represents side walls of the usual and ordinary milk can container employed for the distribution of loose milk to the consumer, while 2 represents the ordinary cover therefor being provided with the usual skirt 66 to seal-tightly engage with the mouth of the said milk can container. The milk can container at the lower cylindrical portion of its neck is provided with a threaded portion designated by numeral 3, the said threaded portion being worked into the milk can itself during the manufacture thereof or being affixed to the ordinary and known container by way of a threaded ring by the ordinary method, such as soldering.

Threaded portion 3, as will hereinafter be more fully described, engages with male thread 66 of cap body 41. 4, 4 are the ordinary handles affixed to the milk can container, while 5 represents the bottom portion of the same as seen by reference to Figure 3 of the accompanying drawings. 6 represents one of a series of bearings for helical springs 24, the said 6 being affixed to the under-side of base portion 5. The reason for the use of springs 24, as will hereinafter be more fully set forth, resides in the adaptation of milk can containers which are likely to vary in their over-all length, the said correction being toward adapting such milk can containers for use in the present structures.

The new refrigerator structure used to cooperate with the other structures herein to be set forth comprises an upper portion 7, a lower portion 8 with which the upper portion is engageable and hand knobs 9 on the upper concave and top piece 10 of the part 7, the said top piece being designed preferably to be in air tight engagement with the upper edge of the neck of the milk can container as shown by a reference to Figure 3 of the accompanying drawings. 10 is, of course, provided with a central aperture 110 continuing with the mouth of the milk can container.

The upper portion 7 of the refrigerator structure, preferably near the top thereof, internally and located in a space of clearance, as will more fully hereinafter be set forth, is provided with perforated pockets comprising said walls 11 and under wall 84, the said pockets utilizing portion 10 as an upper wall and the inner lining of 7 as a back wall. Said pockets are open at the front for the insertion of cooling or freezing material such as dry ice 12, the circulation of the emanating cold therefrom being effected through the aforementioned perforations. It is understood, of course, that the cooling mechanism set forth as above is preferential in conjunction with the refrigerator structure now about to be described. 13 represents any insulating material such as cork preferably between the metallic-lined walls of upper portion 7 of the refrigerator, while 14 is a shoulder of the lower edge of the outer lining of 7 for engagement with the upper periphery of lower portion 8 of the refrigerator.

15 is the corresponding insulating material between the metallic-lined walls of lower portion 8 of the refrigerator structure, it being seen by a reference to Figure 3 that the over-all thickness of the walls of the said 8 is necessarily greater than the over-all thickness of upper portion 7 by reason of other structures appearing at the upper portion of the said 8 as will hereinafter be set forth. 16 represents the bottom piece of 8, while 17 is a supporting and connecting member, such as an annular angle iron, resting on the upper face of 16 and supporting an insulating base member such as 18, while 19 is an internal bottom covering, preferably metallic, for portion 8 of the refrigerator. 20 is one of a series of vertical reinforcement strips affixed in place by reinforcement and annular ring 21, the said reinforcements in addition to annular angle iron 7 serving to maintain the interior space of portion 8 in a non-warped condition. 22 is a reinforcement member, preferably an annular channel iron for the top edge of 8, the said iron binding strips 20 and annular ring 21 with the top edge or periphery of 8, the upper face and outer wall of the said 22 serving as a bearing for the lower edge and shoulder 14 of 7, respectively.

23 are bearings corresponding to bearings 6 as hereinbefore set forth and are affixed to lining 19, bearings 6 and 23 being in vertical alignment and serving to maintain the positions of springs 24. The bearings and the springs therewith serve to maintain the rigidity of milk can containers of varying lengths and at the same time to prevent the said containers from rotating, moving and shaking when the refrigerator with the enclosed container is rotated about axes 27, as hereinafter will be more fully set forth. Mountings 6 and 23 serve to position the said milk can container, such that there is air clearance between the walls and bottom of the milk can container and the inner lining of the refrigerator mechanism.

25 represents handles diametrically opposed and affixed to the upper portion of member 8 as at 26 for purposes of lifting and moving the lower portion of the refrigerator mechanism up to a supporting apparatus hereinafter to be described. It may be mentioned at this time that in mounting the said member 8, the same may be done either with the milk can container therein or the said member 8 may be tilted to a horizontal position on laterally and oppositely situated axes 27 by lowering the bearings for the said axes, if so desired, by means of an optionally lifting mechanism hereinafter to be described.

When member 8 is in the last mentioned position, less effort is involved in setting the milk can container by adroit manipulation into final position on springs 24. 27, as aforementioned, are spindles diametrically opposed and affixed to member 8 of the refrigerator structure, preferably penetrating through the wall of the said 8. The said spindles are axes for the said refrigerator, being affixed at a height conducive to easy forward and rear rotation of the said refrigerator when the latter has mounted therein the milk can container and the contents thereof. It will be seen hereinafter that by slight hand-pressure, the refrigerator is easily brought to a horizontal position when the outer discharge valve, hereinafter to be described, is in condition for pouring loose milk.

28 represents any known type of bearing for axes or spindles 27 and as best shown in Figure 4 is U in shape to allow for both the mounting and rotatable support of the said spindles. 29 are upright supports for bearings 28, and as shown in the accompanying drawings in Figure 1 are operating arms for raising and lowering the refrigerator, the said arms being members of an hydraulic lifting mechanism to be described. It is to be understood that arms 29 may be stationary and merely the upright members of a frame furnishing the support for bearings 28; but as represented in the accompanying drawings, the mechanism shown is to alleviate excessive effort in the setting of the milk can container in the refrigerator, as before mentioned.

In accordance with the raising apparatus shown, operating arms 29 operate as large pistons in a hydraulic raising apparatus. The hydraulic raising apparatus is shown on one side only of Figure 1, it being understood of course that there is a duplicate mechanism on the opposite side controlled by the same foot lever and by the same valve 36, hereinafter to be specifically set forth. 32 is the cylinder for piston 29, while smaller piston 40 acts in cylinder 34. 37 is the piston rod for piston 40 while 35 is the communicating chamber between cylinders 34 and 32. 38 is a foot member whereon pressure is applied and is pivoted on a laterally extending lug 39 of base plate 33, the inner end of the foot member being suitably connected to piston rod 37. 36 is a one-way valve therewith for lowering the refrigerator structure and the milk can container therein; the said valve is turned to release the fluid contents from cylinder 32. The described hydraulic structure is set forth merely by way of illustration, no claim being made to any specific construction therein.

Figure 5:
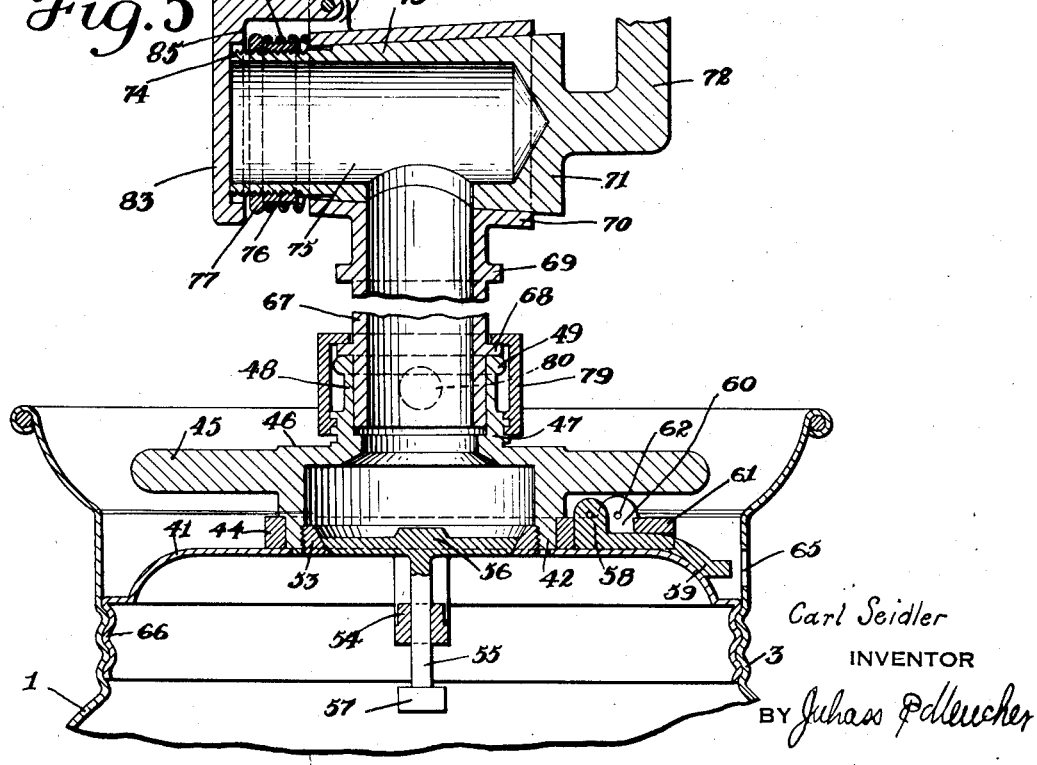
Figure 5 is a diametric section taken through the upper portion of a milk can container as Figure 2, excepting that the cover thereof is detached while the outer discharge valve is shown coupled with the uni-directional valve affixed to the milk can container body.

Reference is now had to the inner and unidirectional valve adapted to engage with threaded portion 3 of the milk can container, the said valve being a part of the invention herein. 41 is a cap body adapted to engage seal-tightly with the milk can container at the vertical and threaded throat portion 3 by means of a complementary threaded skirt 66, as best shown in Figures 2 and 5. 41 is provided with a central aperture to which a valve receiving body is affixed and which body extends upwardly therefrom, the uppermost portion of the said valve body not quite reaching the upper surface of cover 2.

The valve receiving body is hollow and comprises an upper casing portion 48, the top edge of said upper portion being provided with any means, such as bead 49, to engage a non-removable cap member 51, the latter keeping in place a seal-tight disc as ordinarily used over the mouth of upper casing portion 48, as will hereinafter be made more clear. Disc member 50 may have printed thereon the date on which the milk can container was filled at the filling station, while non-removable cap member 51 prevents unauthorized tampering with the milk can container containing the milk, since in order to remove disc 50, the non-removable cap member 51, as shown in Figure 4, must be torn at a diagonal strip on its upper surface. 51 has been designated as a non-removable cap member but in the sense that an unauthorized tampering therewith to remove disc 50 will easily be detected by the distributor to the ultimate consumer. Cap 51 is applied at the filling stations.

Lower external edge of casing portion 48 is provided with threads 47 to engage a coupling member 79, preferably with hand knobs 80 extending therefrom for affixing an external discharge valve to the said valve receiving body. The discharge valve is applied after the milk can container, as shown in Figure 2, with cap member 2 thereon engaged, has been received by the retailer for purposes of dispensing the milk contents of the same. Cap member 2 is simply removed, non-removable cap 51 is broken away, disc 50 withdrawn and then the external discharge valve is affixed.

Returning now to the inner uni-directional valve, the bore of upper casing portion 48 downwardly is contracted and then expanded to form a passage for valve body 56, the lower edge of the said extended passage being preferably threaded as at 53 to engage with a valve frame 52. Valve body 56 is preferably a disc, having its peripheral edge conical in shape to form a ground-joint with a corresponding conical seat situated at the inner edge of an annular portion of the said valve frame 52. The outer edge of the said annular portion of valve frame 52 is designed to engage with the threaded portion 53 as beforementioned. The valve receiving body is affixed to the central aperture of cap body 41 at the lower part of casing portion 43 of the valve receiving body, the said 43 being diametrically reduced at the outer surface and near the lower edge thereof as at 42 to form a limiting shoulder for collar 44, the bottom face of the said collar 44 bearing against the upper face of cap 41. 45 are handles diametrically opposed and projecting horizontally from casing portion 46 of the valve receiving body for purposes of removing and engaging cap body 41 from and to the milk can container 1 at threaded portion 3.

Valve body 56 at the central portion thereof is provided with a downwardly extending rod 55 provided with a nut 57 at an end thereof. The said rod 55 in conjunction with bearing surface therefor 54 serves to bring about a gravitational sliding of valve body 56 in and out of the seating therefor, as represented in Figure 2 of the accompanying drawings.

Valve frame 52 as represented comprises an upper annular member, the inner edge as beforementioned affording a seat for the periphery of valve body 56, while the outer edge is threaded to engage with 53. Bearing 54 for rod 55 comprises merely an expansion of the longitudinal member of a U shaped support diagonally connected with the annular member of valve frame 52. The valve mechanism just described is shown on the accompanying drawings in Figures 2 and 5, the valve frame of Figure 2 being shown as a side elevation on Figure 5.

It is seen by reference to Figures 2 and 5 that the clearance for valve body 56 in the expanded passage of casing portion 43 makes the said valve body 56 operate as a uni-directional valve in conjunction with frame member 52. 59 is a latching finger, the end portion of which is adapted to penetrate opening 65 of the neck of milk can container 1 to prevent or detect unlawful or illegitimate removal of cap body 41 by unscrewing the same in the manipulation of arms 45 with the valve receiving body. Latching finger 59 is slidably mounted in block 61, the said block being permanently affixed to the wall of collar 44 and resting on the upper face of cap member 41. 60 in Figure 2 represents the sliding clearance of finger 59. 58 is a vertical extending grip lug of finger 59 while 62 are oppositely positioned and vertically extending lugs from the upper face of block 61 arranged and constructed to be in alignment with lug 58, when finger 59 is in extreme penetrating position with opening 65. Orifices penetrate lugs 58 and 62, such that when in alignment any threaded material or wire such as 63 may maintain the latching finger 59 in locked position with respect to milk can container 1.

64 represents any seal or detecting device, indicating whether or not the latching mechanism has been illegitimately tampered with toward the removal of cap body 41 from the milk can container. Finger 59 may engage with orifice 65 before cap body 41 is in final engaged position with milk can container 1 at 3, by reason of vertical clearance of orifice 65 above and below the thickness of finger 59. By such an arrangement, it becomes impossible for latching finger 59 to be out of alignment with orifice 65 when cap member 41 is in engagement with milk can container 1 at 3.

The upper portion 7 of the refrigerator structure is detachably secured to lower portion 8 thereof in any known fashion. For purposes of illustration, pegs 30 and notch 31 constitute the means. 30 are preferably situated on the outer surface of channel iron 22, being diametrically opposed, while 31 are corresponding notches situated on the skirt portion of shoulder 14 of member 7, the said notches being preferably right-angled. With the present latching mechanism it becomes obvious that to affix member 7 on 8 of the refrigerator, member 7 is turned on member 8 until the vertical portions of notches 31 secure pegs 30. Then member 7 is rotated slightly until said pegs 30 recess at the limit of the horizontal portions of notches 31, as best shown in Figure 3 of the accompanying drawings.

Reference is now had to Figure 2. In order to couple the discharge valve of the present structure to the internal and uni-directional valve, it becomes necessary to remove milk can container cover 2, tear the non-removable cap member 51 and remove disc 50 to afford the passage between the internal and the discharge valves. Figure 3 shows the said valves as coupled in a vertical position, while Figure 1 in broken lines shows the horizontal position of the discharge valve when ready for operating purposes. The discharge valve per se is ordinary and well known in the art. It comprises a tubular portion 67, the lower end of which is adapted to fit into the bore of 48, as seen in Figure 5 of the accompanying drawings. 68 is a shoulder or annular flange near the lower end of tubular portion 7 and rests on bead 49 of upper casing 48, the said shoulder 68 and the lower threaded portion 47 cooperating with coupling member 19 for seal-tight connection of both the discharge and the internal valves. 69 is a shoulder similar to shoulder 68 but spaced thereabove to act as an upper stop for coupling member 79 when the latter is disconnected from the valve receiving body of the inner valve mechanism. 70 is a valve casing with an internal conical taper to receive a correspondingly conical plug 73, the said plug having a bore 75 communicating preferably at right angles with the bore of tubular portions 67.

72 is a control handle affixed to the plug 73 by plate 71 and is used for normal purposes, such as the release and the cutting off of the supply of milk from milk can container 1. 74 is the lower portion of valve plug 73 and projects beyond the outer edge of the valve casing 70, the said 74 being threaded. 76 is a section of a tube internally threaded to engage with threaded portion 74 of valve plug 3, while coil spring 78 surrounding the walls of 76 is held in tension between the lower expanded edge of 74 or bead 77 and the lower or outer edge of valve casing 70. Bore 75 of plug member 3, of course, may be grooved for the normal reasons of affording a steady and even flow, it not being deemed necessary to represent the said grooves in the accompanying drawings.

Numerals 81 to 84, inclusive, represent a mechanism, gravitationally operated and designed to form a seal for the mouth of bore 75 when the discharge valve is in vertical position, as illustrated in Figures 1 and 5. 81 is a lug projecting off the front face and at the lower edge of valve casing 70. Pivotally affixed to lug 81 is a longitudinal arm 82 with a disc member 83 perpendicularly extending therefrom, the said disc member being adapted on its inner face to form a closure for the mouth of the discharge valve. 85 is an outer horizontal flange of the inner face of the said disc member 83 serving to partially enclose a portion of 74. The last described mechanism has its perpendicular parts so weighted as to permit the action of gravity to release disc member 83 from the mouth of the discharge valve when the latter is in horizontal position, as shown in Figure 1, and to cause the said disc member 83 to close the mouth of the discharge valve when in perpendicular position, as also shown in Figure 1. The discharge valve is provided with the said gravitationally operated closure mechanism to avoid the collection of insects, flies, etc., around the mouth of the discharge valve, which mouth will necessarily contain and drip a certain milk quantity.

The invention proper comprises an internal and uni-directional valve engaging a milk can container, an outer discharge valve adapted to couple with the first-mentioned valve and a rotatable refrigerator to serve both as a mixing and cooling mechanism, all as heretofore described. In addition, the invention comprehends other incidental features, such as a closure mechanism for the mouth of the discharge valve and a locking mechanism to prevent unauthrized tampering with the internal and uni-directional valve. All structures hereinbefore set forth, it is to be understood, have been described as merely preferred embodiments and for purposes of illustration only.

Mention is now made of the mode of operation of the uni-directional valve. In its normal position with respect to the milk can body or container, valve body 56 by the action of gravity is seal-tightly engaged with the conical and annular seat of valve frame 52. When the valve mechanism and the milk can container connected therewith is tilted 90 degrees more or less from the normal vertical position, said valve body 56 disengages from its corresponding seat and affords a free passage for the contents therebeyond.

In practicing the present invention for the distribution of loose milk, the demands of the ultimate consumer are secured as regards sanitary distribution, freshness and freedom from adulteration; the demands of the storekeeper or retailer are secured as regards easy and clean refrigeration, elimination of an agitator and dipper, elimination of fly and insect attraction and finally easy dispensing of the loose milk; the demands of the transportation companies are secured as against spilling losses; the demands of the filling stations as regards subsequent adulteration; and last, but not least, the demands of the health authorities as laid down in the various city ordinances are carried out effectively by the various structures hereinbefore set forth.

Briefly, when the milk can is received at the filling station, loose milk is poured therein in proper quantity as under the existing system. Thereupon the uni-directional valve mechanism is caused to engage with the said can body seal-tightly. Collar 44 of the valve mechanism is rotated until latching finger 59 is opposite orifice 65, at which time grip lug 58 is manipulated to extend the said finger in engagement with the said orifice 65 of the milk can container. In such a position, the orifices of lugs 58 and 62 are in alignment to receive a thread or wire 63 brazed or sealed together with seal 64. If the said seal 64 is intact when a milk can is returned for refilling purposes, such a condition indicates that latching finger 59 has remained in locked position, giving assurance to both the filling and health authorities that the one-way valve mechanism has not been detached from the milk can body for purposes of adulteration since the time of its previous filling.

Following the engagement of the uni-directional valve mechanism with the said can body, seal-tight disc 50 is attached to the spout of the valve mechanism. This disc may have printed thereon the time and hour when the milk can has been filled to satisfy the health authorities, the retailer and the ultimate consumer as to the freshness of the milk. To prevent unauthorized substitution of and tampering with the said disc 50, a tearable but non-removable cap member 51 guards the disc against such activities and assures the store-keeper or retailer that the printed matter on the disc is genuine.

The milk can container now is ready to be covered by can cover 2 putting the milk can container with its contents therein in readiness for transportation with assurance that any jarring causing the cap to fall off while the milk can is in transit, will not entail loss of milk through the operation of disc and cap members 50 and 51, respectively. Upon the retailer's or store-keeper's receiving the can of milk so prepared, he removes the cover 2, feeling certain that no cream has been extracted since seal 64, controlling the removal of the valve mechanism, is intact and non-removable cap member 51 has not been torn off. The can of milk is now mounted in lower portion 8 of the refrigerator structure on springs 24. The refrigerator structure together with the milk can container therein, is then mounted on bearings 28 by way of laterally extending spindles 27. The top portion of the refrigerator is now adjusted, pressure being applied to the milk can container to keep the same in tension between the upper and lower portions of the refrigerator. The discharge valve is now coupled with the uni-directional valve as hereinbefore mentioned.

The store-keeper in dispensing his milk tilts with the slightest hand-pressure the refrigerator to the broken line position of Figure 1, so that the milk to be measured out pours out by the action of gravity, while the tilting of the refrigerator and the can of milk contained therein also serves to agitate and stir the milk contents. The bearing mechanism 28 may be fixed or movable and, as shown, operated by an hydraulic mechanism, for purposes of giving the refrigerator and the milk can container therein almost a 180 degree swing or for purposes of easier initial mounting of the refrigerator on the said bearings.

In practicing the invention only a few advantages have been set forth. Other advantages, obviously incidental, have been omitted, since the invention may be adapted to any system controlled and operated under city and health laws.

It is understood that minor changes in structure, combination, cooperation and position of the several parts of the invention may all be resorted to without departing from the spirit of the invention, nor departing from the scope of the appended claims.

I claim:

1. In combination with a milk container for storing and dispensing loose milk, an integrally removable and insertable gravity acting one-way outlet valve mechanism seal-tightly engaging with the neck portion of the said milk container, a refrigerator enclosure within which the said container is firmly mounted, a discharge valve coupled in normally upwardly vertical position with the said one-way valve mechanism, a support on which the refrigerator is pivotally mounted, the last mentioned pivotal mounting means being regulated to maintain a normally vertical position for the said refrigerator and permitting easy manual forward tilting for agitating the loose milk and positioning the discharge valve for dispensing purposes.

2. In combination with a milk container for storing and dispensing loose milk, an integrally removable and insertable gravity acting one-way outlet valve mechanism seal-tightly engaging with the neck portion of the said milk container, a refrigerator enclosure within which the said container is firmly mounted, a discharge valve coupled in normally upwardly vertical position with the said one-way valve mechanism, a vertically movable support on which the refrigerator is pivotally mounted, the last mentioned pivotal mounting means being regulated to maintain a normally vertical position for the said refrigerator and permitting easy manual forward tilting for agitating the loose milk and positioning the discharge valve for dispensing purposes.

3. In combination with a milk container for storing and dispensing loose milk, an integrally removable and insertable gravity acting one-way outlet valve mechanism seal-tightly engaging with the neck portion of the said milk container, locking means to prevent unauthorized disengagement of the said valve mechanism, a refrigerator enclosure within which the said container is firmly mounted, a discharge valve coupled in normally upwardly vertical position with the said one-way valve mechanism, a support on which the refrigerator is pivotally mounted, the last mentioned pivotal mounting means being regulated to maintain a normally vertical position for the said refrigerator and permitting easy manual forward tilting for agitating the loose milk and positioning the discharge valve for dispensing purposes.

4. In combination with a milk container for storing and dispensing loose milk, an integrally removable and insertable gravity acting one-way outlet valve mechanism seal-tightly engaging with the neck portion of the said milk container, a refrigerator enclosure within which the said container is firmly mounted, a discharge valve coupled in normally upwardly vertical position with the said one-way valve mechanism and being provided with a mouth closure adapted to close the mouth of the said discharge valve when in normal vertical position and to be free therefrom when in operative and tilted position, a support on which the refrigerator is pivotally mounted, the last mentioned pivotal mounting means being regulated to maintain a normally vertical position for the said refrigerator and permitting easy manual forward tilting for agitating the loose milk and positioning the discharge valve for dispensing purposes.

5. In combination with a milk container for storing and dispensing loose milk, an integrally removable and insertable gravity acting one-way outlet valve mechanism seal-tightly engaging with the neck portion of the said milk container, locking means to prevent unauthorized disengagement of the said valve mechanism, a refrigerator enclosure within which the said container is firmly mounted, a discharge valve coupled in normally upwardly vertical position with the said one-way valve mechanism and being provided with a mouth closure adapted to close the mouth of the said discharge valve when in normal vertical position and to be free therefrom when in operative and tilted position, a support on which the refrigerator is pivotally mounted, the last mentioned pivotal mounting means being regulated to maintain a normally vertical position for the said refrigerator and permitting easy manual forward tilting for agitating the loose milk and positioning the discharge valve for dispensing purposes.

6. In combination with a milk container for storing and dispensing loose milk, an integrally removable and insertable gravity acting one-way outlet valve mechanism in seal-tight and threaded engagement with the neck portion of the said milk container, and a discharge valve coupled in normally upwardly vertical position with the said gravity acting one-way outlet valve mechanism, the discharge valve being operable when the said one-way outlet valve mechanism is out of its normally upwardly vertical position.

CARL SEIDLER.